(12) United States Patent
Cai (10) Patent No.: US 11,629,740 B2
(45) Date of Patent: Apr. 18, 2023

(54) CONNECTOR AND FRAME STRUCTURE USING SAME

(71) Applicant: HANGZHOU CLEAN DELL SANITARY WARE CO., LTD., Zhejiang (CN)

(72) Inventor: Jiannong Cai, Zhejiang (CN)

(73) Assignee: HANGZHOU CLEAN DELL SANITARY WARE CO., LTD., Zhejiang (CN)

( * ) Notice: Subject to any disclaimer, the term of this patent is extended or adjusted under 35 U.S.C. 154(b) by 134 days.

(21) Appl. No.: 16/763,682

(22) PCT Filed: Mar. 23, 2018

(86) PCT No.: PCT/CN2018/080221
§ 371 (c)(1),
(2) Date: May 13, 2020

(87) PCT Pub. No.: WO2019/095601
PCT Pub. Date: May 23, 2019

(65) Prior Publication Data
US 2020/0370581 A1   Nov. 26, 2020

(30) Foreign Application Priority Data
Nov. 15, 2017   (CN) .......................... 201711129532.5

(51) Int. Cl.
*F16B 2/14*  (2006.01)
*F16B 7/04*  (2006.01)
(Continued)

(52) U.S. Cl.
CPC .................. *F16B 7/04* (2013.01); *F16B 2/14* (2013.01); *F16B 7/22* (2013.01); *F16B 12/32* (2013.01);
(Continued)

(58) Field of Classification Search
CPC .......... F16B 7/04; F16B 7/044; F16B 21/065; F16B 21/07; F16B 21/073; F16B 21/075;
(Continued)

(56) References Cited

U.S. PATENT DOCUMENTS

| 4,025,216 A | * | 5/1977 | Hives | F16B 12/26 403/381 |
| 4,488,843 A | * | 12/1984 | Achille | F16B 19/1081 411/385 |
| 5,704,746 A | * | 1/1998 | Leib | F16B 19/1081 411/24 |

(Continued)

FOREIGN PATENT DOCUMENTS

| CN | 203822777 U | 9/2014 |
| CN | 206017376 U | 3/2017 |

(Continued)

*Primary Examiner* — Michael P Ferguson
(74) *Attorney, Agent, or Firm* — Muncy, Geissler, Olds & Lowe, P.C.

(57) ABSTRACT

A connector and a frame structure using the same, wherein the connector at least comprises a socket, a bolt and an expansion bolt; the socket comprises a connection end, and a slot, which extends along a length direction of the socket from an end surface of the connection end, is provided on the socket; the bolt comprises a bolt main body that is adapted to the slot, a front end of the bolt main body is provided with at least two expansion arms, and the bolt main body is internally provided with an expansion channel which traverses the bolt main body along a length direction; and the expansion bolt comprises an expansion bolt main body that matches the expansion channel, a front end of the expansion bolt main body is provided with an acting end that interacts with the expansion arm, and the socket and the bolt are tightly connected by means of an expansion force that is generated by the acting end opening the expansion arms. The aforementioned connector achieves quick disassembly (Continued)

and assembly, and also has the advantages of reliable connection, convenient disassembly and assembly and long service life.

5 Claims, 4 Drawing Sheets (51) Int. Cl.
*F16B 7/22* (2006.01)
*F16B 21/07* (2006.01)
*F16B 21/18* (2006.01)
*F16B 12/32* (2006.01)
*F16B 21/06* (2006.01)

(52) U.S. Cl.
CPC ............ *F16B 21/065* (2013.01); *F16B 21/07* (2013.01); *F16B 21/18* (2013.01); *Y10T 403/32451* (2015.01); *Y10T 403/7066* (2015.01)

(58) Field of Classification Search
CPC ...... F16B 9/05; F16B 9/09; F16B 2/04; F16B 2/14; F16B 7/0446; F16B 12/20; F16B 12/26; F16B 12/28; F16B 12/32; F16B 12/38; Y10T 403/32426; Y10T 403/32434; Y10T 403/32451; Y10T 403/7064; Y10T 403/7066
See application file for complete search history.

(56) References Cited

U.S. PATENT DOCUMENTS

| | | | |
|---|---|---|---|
| 6,860,455 B1 * | 3/2005 | Richardson | E04D 13/08 |
| | | | 248/74.1 |
| 10,015,895 B2 * | 7/2018 | Sheng | H05K 5/0208 |
| 10,570,937 B2 * | 2/2020 | Hefelfinger | H01R 4/2483 |
| 2008/0193250 A1 * | 8/2008 | Boubtane | F16B 21/065 |
| | | | 411/48 |
| 2015/0233181 A1 * | 8/2015 | Walsh | E06C 7/50 |
| | | | 403/66 |

FOREIGN PATENT DOCUMENTS

| | | | | |
|---|---|---|---|---|
| CN | 107747579 A | | 3/2018 | |
| CN | 207437526 U | | 6/2018 | |
| DE | 34 37 930 | * | 6/1986 | ............. F16B 12/24 |
| DE | 29918363 U1 | * | 1/2000 | ............ F16B 37/043 |
| DE | 102013008503 A1 | * | 11/2014 | ............ F16B 21/073 |
| EP | 1041297 A2 | * | 10/2000 | ............. F16B 12/24 |
| FR | 2 724 893 A1 | | 3/1996 | |
| GB | 2539395 A | * | 12/2016 | ................ F16B 2/12 |

* cited by examiner

CONNECTOR AND FRAME STRUCTURE USING SAME

TECHNICAL FIELD

The present invention discloses a connector and a frame structure using the same.

BACKGROUND ART

In a frame structure, it is often necessary to connect different components. A conventional manner is welding or screw connection, which is not only time-consuming and laborious, but also inconvenient for repeated disassembly and assembly.

The Chinese utility model patent with the publication number CN 206017376U discloses a quick installation structure, including a socket, a bolt and a bolt base. The socket is provided with a slot, and the slot is provided with clamping blocks which can be retracted into inner walls of the slot. One end of the bolt is provided with clamping grooves in one-to-one correspondence with the clamping blocks, and the bolt is clamped with the clamping grooves through the clamping blocks. During installation, the socket and the bolt base are respectively connected to different components needing to be connected, and then, the bolt is inserted into the socket to complete quick connection between two components. When disassembly is needed, it is only necessary to apply a reverse pulling force to the two connected components to withdraw the bolt from the socket. Therefore, the installation and disassembly are very convenient. In addition, a tail end of the bolt can slide in the bolt base, and a clamping device is provided between the bolt and the socket. A distance between the two connected components can be adjusted within a certain range, so that the ability to adjust the production accuracy of the frame structure during installation is very good.

However, the above technical solution still has the following problems.

1. In order to reserve a sufficient space for the movement of the clamping block structure, the size of the clamping groove on the slot will be slightly larger than that of the clamping block structure. That is, in a connected state, there will be a certain gap between a side wall of the clamping groove and the clamping block. The existence of the gap causes a slight relative movement between the two connected components, which seriously affects the service performance of the clamping block structure. Furthermore, when a load is suddenly applied to the connected components or the load direction changes, the clamping block will be subjected to an impact load, and the clamping block structure is easily damaged.

2. In order to improve the reliability of connection between the socket and the bolt, an inclination angle of a side surface of the slot at the end away from a slide block is usually smaller, and then, a larger pulling force needs to be applied to the connected components during disassembly to separate the bolt from the socket. After the connector is used for a period of time, it is likely that the clamping block structure will rust, which further affects the disassembly of the connector.

3. In a connected state, the load between the two components is fully borne by the clamping block, which easily causes damage to the clamping block structure. Once the clamping block structure is broken, the connection of the connector is also disconnected immediately, which affects the service performance.

4. In order to realize the distance adjustment within a larger range, the length of the bolt will be set longer, correspondingly, the length of the bolt base is also longer, and the overall size of the connector is larger, which is not conducive to installation.

SUMMARY OF THE INVENTION

The technical problem to be solved by the present invention is to provide a connector and a frame structure using the same. The connector achieves quick disassembly and assembly, and also has the advantages of reliable connection, convenient disassembly and assembly and long service life.

In order to solve the above technical problem, the technical solution provided by the present invention is as follows: a connector at least includes:

a socket, including a connection end, wherein a slot, which extends along a length direction of the socket from an end surface of the connection end, is provided on the socket;

a bolt, including a bolt main body that is adapted to the slot, wherein a front end of the bolt main body is provided with at least two expansion arms, and the bolt main body is internally provided with an expansion channel which traverses the bolt main body along the length direction; and an expansion bolt, the expansion bolt including an expansion bolt main body that matches the expansion channel, wherein a front end of the expansion bolt main body is provided with an acting end that interacts with the expansion arm, and the socket and the bolt are tightly connected by means of an expansion force that is generated by the acting end opening the expansion arms.

The bolt main body is based on the standard that it can move freely in the slot along the length direction of the slot in a natural state. In a connected state, the expansion arm is inserted into the slot, the acting end of the expansion bolt is inserted from an expansion bolt channel and opens the expansion arms to an inner wall direction of the slot, finally, the expansion arm is in contact with an inner wall of the slot, and tight connection is achieved through an acting force between the expansion arm and the inner wall of the slot.

When disassembly is needed, it is only necessary to apply a reverse acting force to an operating end of the expansion bolt away from the acting end, and then, the expansion bolt can be pulled out of the slot. When the expansion force of the expansion bolt acting on the expansion arm disappears, the expansion arm is reset and separated from the inner wall of the slot, and then, the expansion arm can be removed from the slot to complete the disassembly operation. The connector achieves quick assembly and disassembly between two components to be connected, and has certain gap adjustment capability and good adaptability.

On the basis of achieving quick disassembly and assembly, compared with the prior art, the present application further has the following beneficial effects.

1. The processes of adjusting the gap and finally inserting and locking the expansion bolt and the process of pulling out the expansion bolt for disassembly have no need of tools and can be completed manually by installation personnel, the operation is simple, and the use is convenient.

2. During normal use, the load is borne by a friction force between the socket and the expansion arm. Once a sudden situation occurs, such as a sudden increase in load, the expansion arm and the bolt main body are broken. In the present application, the operating end of the expansion bolt can be set larger in size and can abut against the bolt in a connected state, so as to prevent the sudden separation between the connected components to improve the safety of connection.

3. Compared with the quick disassembly and assembly structure in the background art, there is no connection gap between the expansion arm and the slot, so even if the load is suddenly reversed, there will be no impact load. Furthermore, in a connected state, the socket and the expansion arm are relatively stationary and cannot shake, so that the structural stability is better.

4. According to the connector of the present application, the gap between the two components to be connected is adjusted through the length of the bolt main body inserted into the slot. Compared with the quick disassembly and assembly structure in the background art, no bolt base is provided, and the overall length of the connector is greatly reduced, which facilitates the installation and use of the connector.

Preferably, the expansion arm is provided with clamping teeth on a surface corresponding to the inner wall of the slot, the side wall of the slot is provided with limiting teeth corresponding to the clamping teeth, and the clamping teeth are meshed with the limiting teeth in a connected state. The expansion arm and the slot are connected by the meshing of the clamping teeth. In addition to the friction force, an interaction force between the clamping teeth and the limiting teeth can also bear the load together, so that the reliability of connection is better.

Preferably, the slot is cylindrical, and the expansion arms are uniformly distributed in a ring shape.

Preferably, a cross section of the slot is rectangular, and at least one pair of the expansion arms are distributed relatively.

Preferably, an end part of the acting end is provided with a first limiting block, and a side surface of the first limiting block away from the acting end is provided with a chamfer. After the installation is completed, the first limiting block passes through the expansion bolt channel and abuts against the expansion arm, so as to prevent the expansion bolt from retreating from the expansion bolt channel to improve the reliability of connection.

Preferably, the expansion arm includes a connecting block, an inner side of the connecting block is provided with a transition slope at the end close to the bolt main body, and the expansion bolt is provided with a second limiting block corresponding to the transition slope and compressing the transition slope. The second limiting block is configured to compress the transition slope to prevent the expansion arm from sinking downward on the side close to the bolt main body, and separating from the inner wall of the slot, thus ensuring that there is a sufficient contact area between the expansion arm and the side wall of the slot to improve the reliability of connection.

Preferably, a limiting groove corresponding to the connecting block is formed between the first limiting block and the second limiting block, the limiting groove is internally provided with a plurality of bulges for compressing the connecting block, and the highest point of the bulge is lower than that of the first limiting block and the second limiting block. The setting of the bulges can ensure that a pressing force of the slot and the expansion bolt on the connecting block is stable and reliable, thereby further improving the reliability of connection.

A frame structure includes a sectional material I, a sectional material 11 and the aforementioned connector. The socket is detachably connected with the sectional material I, the bolt is detachably connected with the sectional material II, and the sectional material I is connected with the sectional material 11 through the connector.

The connector achieves quick connection and disassembly between sectional materials to be connected. When in use, the sectional materials can be directly and quickly connected at an installation site, so that the installation flexibility is better, and the cost of storage and transportation is greatly reduced.

Preferably, the sectional material II includes a cross beam and a side beam, and the cross beam is detachably connected with the side beam.

Preferably, the bolt is connected with the side beam, the bolt further includes an installation part, the installation part is provided with a preset hole, and the cross beam is connected with the side beam and the bolt through a three-in-one connector.

DETAILED DESCRIPTION OF THE INVENTION

In order to make the objectives, technical solutions and advantages of the present invention more clear, the present invention will be further described in detail below with reference to the drawings and embodiments. It should be understood that the specific embodiments described herein are merely configured to illustrate the present invention and are not intended to limit the present invention.

Embodiment

Figure 1:
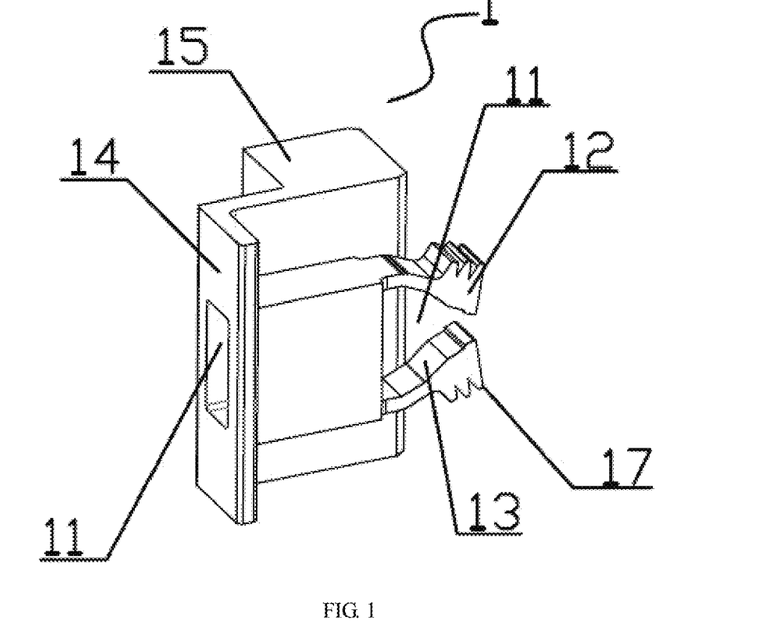
FIG. 1 is a structural schematic diagram of a bolt in a connector according to the present embodiment.
Figure 2:
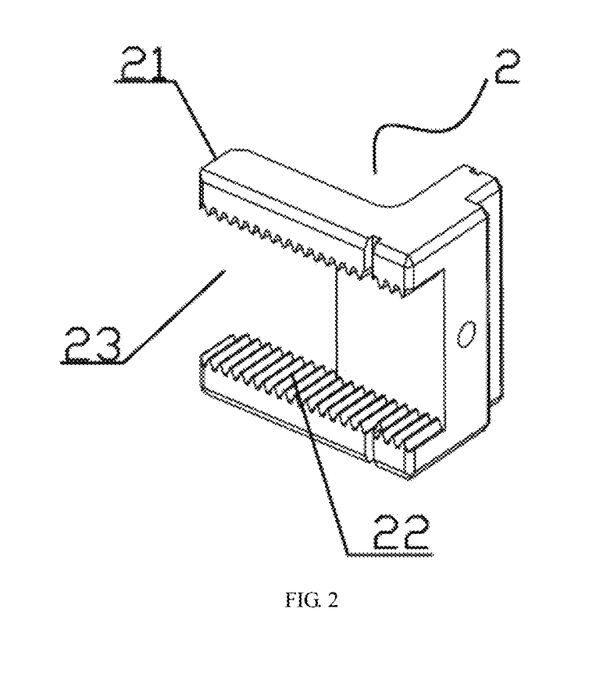
FIG. 2 is a structural schematic diagram of a socket in the connector according to the present embodiment.
Figure 3:
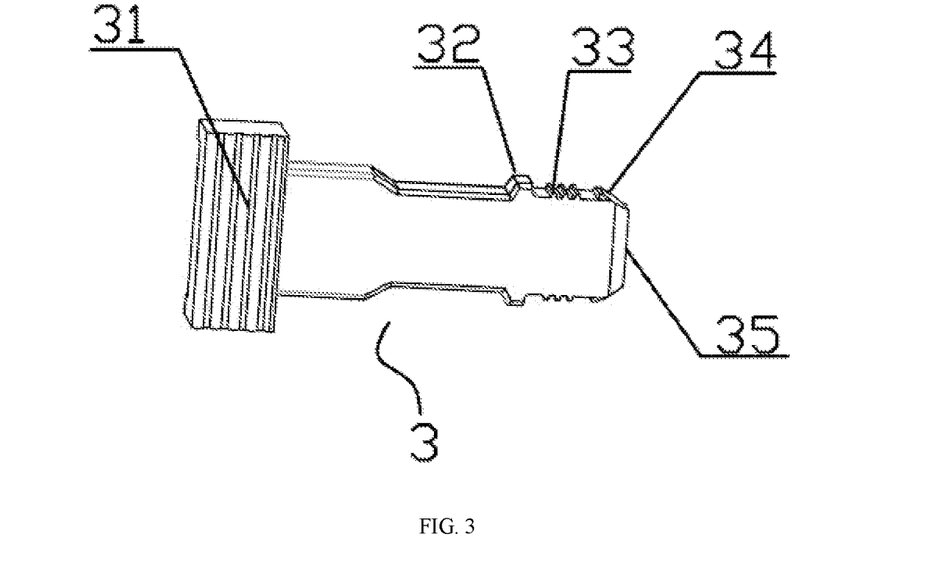
FIG. 3 is a structural schematic diagram of an expansion bolt in the connector according to the present embodiment.
Figure 4:
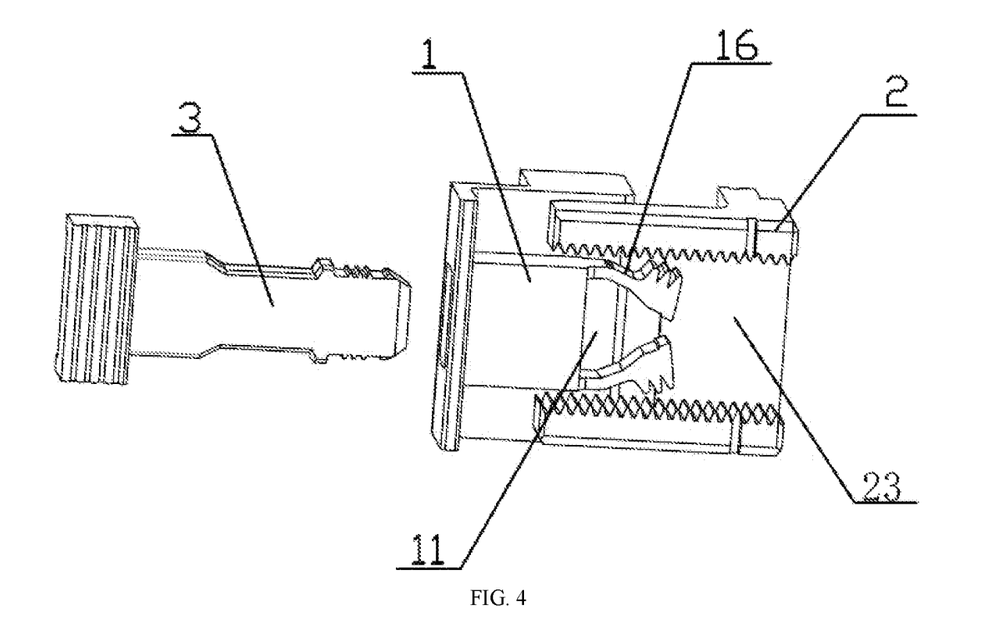
FIG. 4 is a structural schematic diagram of the connector according to the present embodiment in a natural state.
Figure 5:
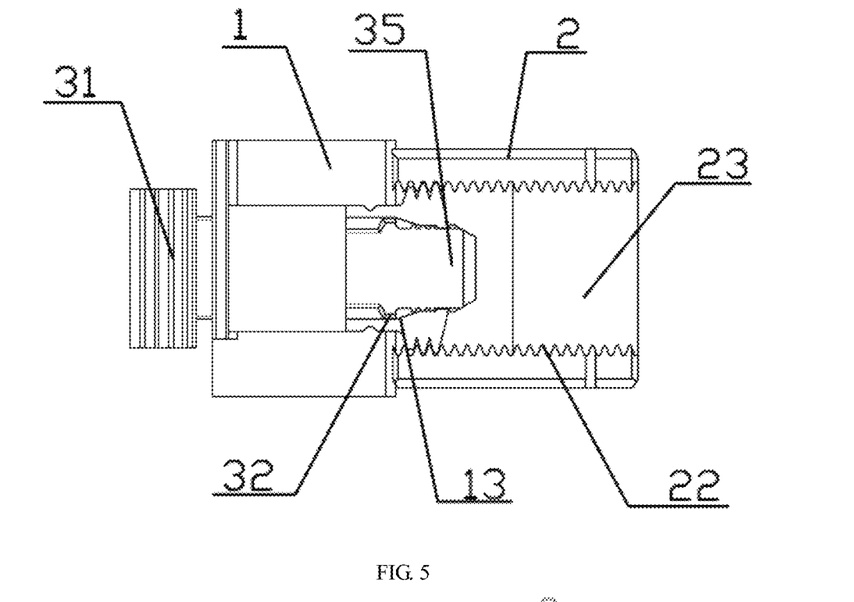
FIG. 5 is a structural schematic diagram of the connector according to the present embodiment in a connected state.

As shown in FIG. 4 and FIG. 5, a connector at least includes a socket 2, a bolt 1 and an expansion bolt 3. As shown in FIG. 2, the socket 2 includes a connection end 21, and a slot 23, which extends along a length direction of the socket 2 from an end surface of the connection end 21, is provided on the socket 2. As shown in FIG. 1, the bolt 1 includes a bolt main body 14 that is adapted to the slot 23, a front end of the bolt main body 14 is provided with at least two expansion arms 16, and the bolt main body 14 is internally provided with an expansion channel 11 which traverses the bolt main body 14 along a length direction. As shown in FIG. 3, the expansion bolt 3 includes a main body of the expansion bolt 3 that matches the expansion channel 11, a front end of the main body of the expansion bolt 3 is provided with an acting end 35 that interacts with the expansion arm 16, and the socket 2 and the bolt 1 are tightly connected by means of an expansion force that is generated by the acting end 35 opening the expansion arms 16.

As shown in FIG. 4, the bolt main body 14 is based on the standard that it can move freely in the slot 23 along a length direction of the slot 23 in a natural state. In a connected state, the expansion arm 16 is inserted into the slot 23, the acting end 35 of the expansion bolt 3 is inserted from a channel of the expansion bolt 3 and opens the expansion arms 16 to an inner wall direction of the slot 23, finally, the expansion arm 16 is in contact with an inner wall of the slot 23, and tight connection is achieved through an acting force between the expansion arm 16 and the inner wall of the slot 23.

As shown in FIG. 3 and FIG. 4, shapes of the slot 23 and the bolt 1 can be set according to needs as long as the slot 23 and the expansion bolt 3 can together compress the expansion arm 16, and the expansion arm 16 need to be reasonably arranged according to the shapes of the slot 23 and the bolt 1. In the present embodiment, the cross section of the slot 23 is preferably rectangular, and at least two of the expansion arms 16 are distributed relatively.

When disassembly is needed, it is only necessary to apply a reverse acting force to an operating end 31 of the expansion bolt 3 away from the acting end 35, and then, the expansion bolt 3 can be pulled out of the slot 23. When the expansion force of the expansion bolt 3 acting on the expansion arm 16 disappears, the expansion arm 16 is reset and separated from the inner wall of the slot 23, and then, the expansion arm 16 can be removed from the slot 23 to complete the disassembly operation.

Further, as shown in FIG. 3, the expansion arm 16 is provided with clamping teeth 17 on a surfaces corresponding to an inner wall of the slot 23, the side wall of the slot 23 is provided with limiting teeth 22 corresponding to the clamping teeth 17, and the clamping teeth 17 are meshed with the limiting teeth 22 in a connected state. The expansion arm 16 and the slot 23 are connected by the meshing of the clamping teeth 17. In addition to a friction force, an interaction force between the clamping teeth 17 and the limiting teeth 22 can also bear the load together, so that the reliability of connection is better.

Further, as shown in FIG. 3, an end part of the acting end 35 is provided with a first limiting block 34, and a side surface of the first limiting block 34 away from the acting end 35 is provided with a chamfer. After the installation is completed, the first limiting block 34 passes through the channel of the expansion bolt 3 and abuts against the expansion arm 16, so as to prevent the expansion bolt 3 from retreating from the channel of the expansion bolt 3 to improve the reliability of connection. The expansion arm 16 includes a connecting block 12, an inner side of the connecting block 12 is provided with a transition slope 13 at an end close to the bolt main body 14, and the expansion bolt 3 is provided with a second limiting block 32 corresponding to the transition slope 13 and compressing the transition slope 13. The second limiting block 32 is configured to compress the transition slope 13 to prevent the expansion arm 16 from sinking downward on the side close to the bolt main body 14, and separating from the inner wall of the slot 23 to ensure that there is a sufficient contact area between the expansion arm 16 and the side wall of the slot 23 to improve the reliability of connection.

As shown in FIG. 3, a limiting groove corresponding to the connecting block 12 is formed between the first limiting block 34 and the second limiting block 32, the limiting groove is internally provided with a plurality of bulges 33 for compressing the connecting block 12, and the highest point of the bulge 33 is lower than that of the first limiting block 34 and the second limiting block 32. The setting of the bulges 33 can ensure that a pressing force of the slot 23 and the expansion bolt 3 on the connecting block 12 is stable and reliable, thereby further improving the reliability of connection.

The connector achieves quick assembly and disassembly between two components to be connected, and has certain gap adjustment capability and good adaptability. The processes of adjusting the gap and finally inserting and locking the expansion bolt 3 and the process of pulling out the expansion bolt 3 for disassembly have no need of tools and can be completed manually by installation personnel, the operation is simple, and the use is convenient. During normal use, the load is borne by the friction force between the socket 2 and the expansion arm 16. Once a sudden situation occurs, such as a sudden increase in load, the expansion arm 16 and the bolt main body 14 are broken. In the present application, the operating end 31 of the expansion bolt 3 can be set larger in size and can abut against the bolt 1 in a connected state, so as to prevent the sudden separation between the connected components to improve the safety of connection.

Compared with the quick disassembly and assembly structure in the background art, there is no connection gap between the expansion arm 16 and the slot 23, and even if the load is suddenly reversed, there will be no impact load. Furthermore, in a connected state, the socket 2 and the expansion arm 16 are relatively stationary and cannot shake, so that the structural stability is better. According to the connector of the present application, the gap between the two components to be connected is adjusted through the length of the bolt main body 14 inserted into the slot 23. Compared with the quick disassembly and assembly structure in the background art, no base of the bolt 1 is provided, and the overall length of the connector is greatly reduced, which facilitates the installation and use of the connector.

Figure 6:
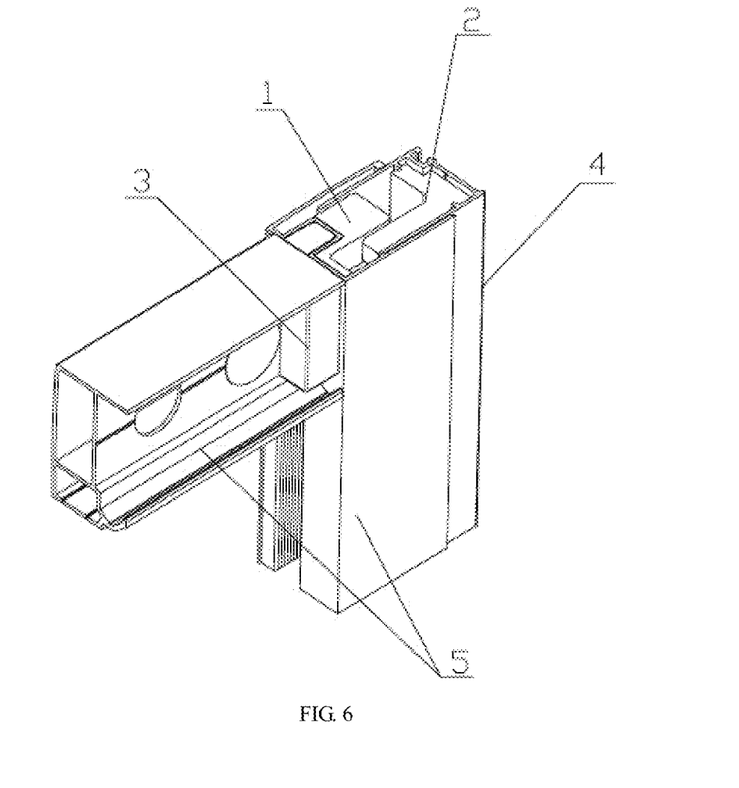
FIG. 6 is a structural schematic diagram of a frame structure according to the present embodiment.
Figure 7:
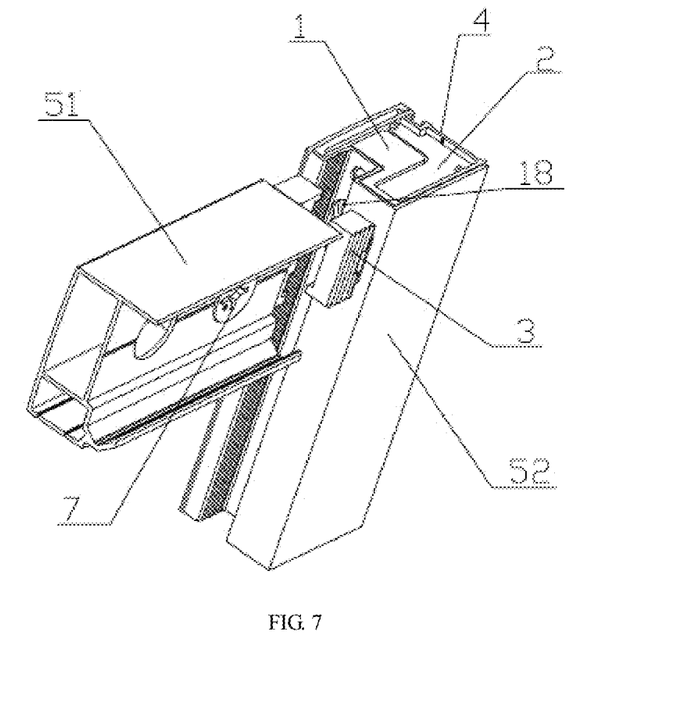
FIG. 7 is a structural schematic diagram of the frame structure according to the present embodiment in another state.

As shown in FIG. 6 and FIG. 7, a frame structure includes a sectional material I 4, a sectional material II 5 composed of a cross beam 51 and a side beam 52, and the aforementioned connector. The bolt 1 further includes an installation part 15, the installation part 15 is provided with a preset hole 18 corresponding to a three-in-one connector 7, and the cross beam 51 is connected with the side beam 52 through the three-in-one connector 7. The socket 2 is detachably connected with the sectional material I 4, the bolt 1 is detachably connected with the sectional material II 5, and the sectional material I 4 is connected with the sectional material II 5 through the connector. The connector achieves quick connection and disassembly between sectional materials to be connected. When in use, the sectional materials can be directly and quickly connected at an installation site, so that the installation flexibility is better, and the cost of storage and transportation is greatly reduced.

It should be noted that the three-in-one connector 7 has been widely applied to the prior art, especially the furniture industry. For example, the Chinese invention patent with the publication number CN 103256280A discloses a detachable connection device for a hollow extruded plastic board, and the structure and functions of the device are the same as those of the three-in-one connector. In the present application, it is merely applied to this field, and the specific structure of the three-in-one connector 7 is not improved, therefore, the structure of the three-in-one connector 7 is not described in detail.

In a word, the embodiments described above are merely preferred embodiments of the present invention, and are not intended to limit the present invention. Any modification, equivalent replacement and improvement made within the spirit and principle of the present invention are intended to be included within the protection scope of the present invention.

The invention claimed is:

1. A connector, comprising:
a socket, comprising a connection end and a slot, the socket extending along a length direction of the socket from an end surface of the connection end;
a bolt, comprising a bolt main body that is adapted to the slot, wherein a front end of the bolt main body is provided with two expansion arms, and the bolt main body is internally provided with an expansion channel which traverses the bolt main body along a length direction; and
an expansion bolt comprising an expansion bolt main body that matches the expansion channel, wherein a front end of the expansion bolt main body is provided with an acting end that interacts with each expansion arm, and the socket and the bolt are tightly connected by an expansion force that is generated by the acting end opening the expansion arms,
wherein in a connected state, the expansion arms are inserted into the slot, the acting end of the expansion bolt is inserted from the expansion channel and opens the expansion arms in an inner wall direction of the slot,
when disassembly is needed, the expansion bolt can be pulled out of the slot, the expansion arms are reset and separated from inner walls of the slot, and the expansion arms can be removed from the slot,
wherein an end part of the acting end is provided with a first limiting block, and a side surface of the first limiting block away from the acting end is provided with a chamfer, and
wherein each expansion arm comprises a connecting block, an inner side of the connecting block is provided with a transition slope at an end close to the bolt main body, and the expansion bolt is provided with a second limiting block corresponding to the transition slope and compressing the transition slope,
wherein a limiting groove corresponding to the connecting block is formed between the first limiting block and the second limiting block, and the limiting groove is internally provided with a plurality of bulges for compressing the connecting block.

2. A frame structure, comprising a sectional material I, a sectional material II and a connector,
wherein the connector comprises:
a socket, comprising a connection end and a slot, the socket extending along a length direction of the socket from an end surface of the connection end;
a bolt, comprising a bolt main body that is adapted to the slot, wherein a front end of the bolt main body is provided with two expansion arms, and the bolt main body is internally provided with an expansion channel which traverses the bolt main body along a length direction; and
an expansion bolt comprising an expansion bolt main body that matches the expansion channel, wherein a front end of the expansion bolt main body is provided with an acting end that interacts with each expansion arm, and the socket and the bolt are tightly connected by an expansion force that is generated by the acting end opening the expansion arms,
wherein in a connected state, the expansion arms are inserted into the slot, the acting end of the expansion bolt is inserted from the expansion channel and opens the expansion arms in an inner wall direction of the slot,
when disassembly is needed, the expansion bolt can be pulled out of the slot, the expansion arms are reset and separated from inner walls of the slot, and the expansion arms can be removed from the slot,
wherein an end part of the acting end is provided with a first limiting block, and a side surface of the first limiting block away from the acting end is provided with a chamfer,
wherein each expansion arm comprises a connecting block, an inner side of the connecting block is provided with a transition slope at an end close to the bolt main body, and the expansion bolt is provided with a second limiting block corresponding to the transition slope and compressing the transition slope,
wherein a limiting groove corresponding to the connecting block is formed between the first limiting block and the second limiting block, and the limiting groove is internally provided with a plurality of bulges for compressing the connecting block,
wherein the socket is detachably connected with the sectional material I, the bolt is detachably connected with the sectional material II, and the sectional material I is connected with the sectional material II through the connector, and
wherein the sectional material I comprises a beam, and the sectional material II comprises a cross beam and a side beam.

3. The frame structure according to claim 2, wherein the cross beam is detachably connected with the side beam.

4. A connector, comprising:
a socket, comprising a connection end and a slot, the socket extending along a length direction of the socket from an end surface of the connection end;
a bolt, comprising a bolt main body that is adapted to the slot, wherein a front end of the bolt main body is provided with two expansion arms, and the bolt main body is internally provided with an expansion channel which traverses the bolt main body along a length direction; and
an expansion bolt comprising an expansion bolt main body that matches the expansion channel, wherein a front end of the expansion bolt main body is provided with an acting end that interacts with each expansion arm, and the socket and the bolt are tightly connected by an expansion force that is generated by the acting end opening the expansion arms,
wherein in a connected state, the expansion arms are inserted into the slot, the acting end of the expansion bolt is inserted from the expansion channel and opens the expansion arms in an inner wall direction of the slot,
when disassembly is needed, the expansion bolt can be pulled out of the slot, the expansion arms are reset and separated from inner walls of the slot, and the expansion arms can be removed from the slot,
wherein each expansion arm is provided with clamping teeth on surfaces corresponding to the inner walls of the slot, the inner walls of the slot are provided with limiting teeth corresponding to the clamping teeth, and the clamping teeth are meshed with the limiting teeth in a connected state, wherein an end part of the acting end is provided with a first limiting block, and a side surface of the first limiting block away from the acting end is provided with a chamfer, wherein each expansion arm comprises a connecting block, an inner side of the connecting block is provided with a transition slope at an end close to the bolt main body, and the expansion bolt is provided with a second limiting block corresponding to the transition slope and compressing the transition slope, wherein a limiting groove corresponding to the connecting block is formed between the first limiting block and the second limiting block, and the limiting groove is internally provided with a plurality of bulges for compressing the connecting block.

5. A connector, comprising:

a socket, comprising a connection end and a slot, the socket extending along a length direction of the socket from an end surface of the connection end;

a bolt, comprising a bolt main body that is adapted to the slot, wherein a front end of the bolt main body is provided with two expansion arms, and the bolt main body is internally provided with an expansion channel which traverses the bolt main body along a length direction; and an expansion bolt comprising an expansion bolt main body that matches the expansion channel, wherein a front end of the expansion bolt main body is provided with an acting end that interacts with each expansion arm, and the socket and the bolt are tightly connected by an expansion force that is generated by the acting end opening the expansion arms, wherein in a connected state, the expansion arms are inserted into the slot, the acting end of the expansion bolt is inserted from the expansion channel and opens the expansion arms in an inner wall direction of the slot, when disassembly is needed, the expansion bolt can be pulled out of the slot, the expansion arms are reset and separated from inner walls of the slot, and the expansion arms can be removed from the slot, wherein each expansion arm is provided with clamping teeth on surfaces corresponding to the inner walls of the slot, the inner walls of the slot are provided with limiting teeth corresponding to the clamping teeth, and the clamping teeth are meshed with the limiting teeth in a connected state, wherein a cross section of the slot is rectangular, and the expansion arms are distributed oppositely, wherein an end part of the acting end is provided with a first limiting block, and a side surface of the first limiting block away from the acting end is provided with a chamfer, wherein each expansion arm comprises a connecting block, an inner side of the connecting block is provided with a transition slope at an end close to the bolt main body, and the expansion bolt is provided with a second limiting block corresponding to the transition slope and compressing the transition slope, wherein a limiting groove corresponding to the connecting block is formed between the first limiting block and the second limiting block, and the limiting groove is internally provided with a plurality of bulges for compressing the connecting block.

* * * * *